(12) United States Patent
Sanchez et al.

(10) Patent No.: US 10,990,357 B2
(45) Date of Patent: Apr. 27, 2021

(54) APPLICATION BUILD AUTOMATION

(71) Applicant: VMware, Inc., Palo Alto, CA (US)

(72) Inventors: Sergio Sanchez, Sofia (BG); Stanislav Hadjiiski, Sofia (BG)

(73) Assignee: VMware, Inc., Palo Alto, CA (US)

( * ) Notice: Subject to any disclaimer, the term of this patent is extended or adjusted under 35 U.S.C. 154(b) by 162 days.

(21) Appl. No.: 15/985,764

(22) Filed: May 22, 2018

(65) Prior Publication Data

US 2019/0361680 A1 Nov. 28, 2019

(51) Int. Cl.
*G06F 9/44* (2018.01)
*G06F 9/445* (2018.01)
*G06F 8/30* (2018.01)
*G06F 8/60* (2018.01)
*G06F 8/61* (2018.01)

(52) U.S. Cl.
CPC ............... *G06F 8/30* (2013.01); *G06F 8/60* (2013.01); *G06F 8/63* (2013.01)

(58) Field of Classification Search
CPC ..... G06F 8/65; G06F 8/67; G06F 8/68; G06F 11/1433; G06F 8/60; G06F 8/30; G06F 8/63
See application file for complete search history.

(56) References Cited

U.S. PATENT DOCUMENTS

| 8,140,358 | B1 * | 3/2012 | Ling | G06Q 40/08 705/4 |
|---|---|---|---|---|
| 9,239,814 | B2 * | 1/2016 | Lagergren | G06F 9/4401 |
| 9,250,893 | B2 | 2/2016 | Blahaerath et al. | |
| 9,323,513 | B2 | 4/2016 | Pillay et al. | |
| 10,010,801 | B2 * | 7/2018 | Wang | G06F 3/017 |
| 10,209,981 | B2 * | 2/2019 | Hirshberg | G06F 11/1433 |
| 2017/0086241 | A1 * | 3/2017 | Lopes | H04L 12/4641 |
| 2018/0332160 | A1 * | 11/2018 | Brogan | G06F 1/1686 |

* cited by examiner

*Primary Examiner* — Chuck O Kendall
(74) *Attorney, Agent, or Firm* — Hanley, Flight & Zimmerman, LLC

(57) ABSTRACT

An example application build automation system can include a management engine configured to receive a first set of definitions corresponding to a first configuration file, receive a second set of definitions corresponding to a second configuration file, generate a first VSCI image using the first configuration file, and generate a second VSCI image using the second configuration file. The example system may further include a build engine configured to receive the first VSCI image and the second VSCI image, generate a build configuration based on the first VSCI image and the second VSCI image, and deploy the build configuration to generate a plurality of build artifacts.

20 Claims, 4 Drawing Sheets

APPLICATION BUILD AUTOMATION

BACKGROUND

Virtual computing instances (VCIs), such as virtual machines (VMs), virtual workloads, data compute nodes, clusters, and virtualized, self-contained computing instances (VSCIs) such as containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VMs can be deployed on a hypervisor provisioned with a pool of computing resources (e.g., processing resources, memory resources, etc.), while VSCIs can be deployed on a host operating system without a hypervisor or separate operating system.

DETAILED DESCRIPTION

Figure 1:
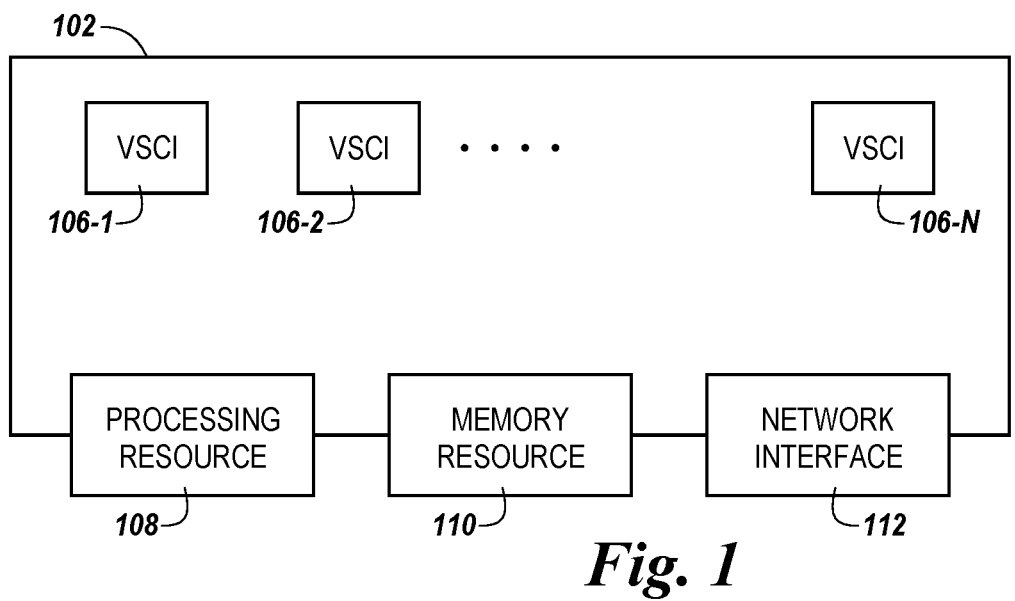
FIG. 1 is a diagram of a host for application build automation according to a number of embodiments of the present disclosure.

The term "virtual computing instance" (VCI) covers a range of computing functionality. VCIs may include non-virtualized physical hosts, virtual machines (VMs), and/or virtualized, self-contained computing instances. A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

The term "virtualized, self-contained computing instance" (VSCI) refers to a specific type of VCI that may be deployed on a host operating system without a hypervisor or separate operating system, such as a container that runs within Linux. A container can be provided by a virtual machine that includes a container virtualization layer (e.g., Docker, Swarm/Compose, and/or Apache Mesos, among others).

In some approaches, VSCI management may be facilitated by the container virtualization layer, which may allow developers and/or DevOps (e.g., software developer/software operations) to deploy, manage, and/or monitor VSCI based-applications. As used herein, "applications" refer to instructions that may be ultimately executed by hardware resources to perform a group of coordinated functions, tasks, or activities for the benefit of a user.

In order to deploy, manage, and/or monitor VSCI based-applications, the developer and/or DevOp may first build the application and then make an image of the application available for use by the VSCI. As used herein, an "image" refers to a serialized copy of the state of a computing system such as a VSCI, a serialized copy of an application used by a computing system such as a VSCI, etc. The image may be stored as a file or set of files that may allow for the application (or state of the computing system) to be provided across more than one computing system or more than one VSCI.

In some approaches, the process of building the application may become cumbersome, especially in local development environments and/or for developers or DevOps of modern applications, which may utilize polyglot programming (e.g., application-based programming in which more than one language (e.g., set of semantics)) and/or development tool is used in the process of building the application. The process of building applications may also become cumbersome in traditional approaches to building applications in which a single language or tool is used in the process of building the application.

As used herein, a "language," which may also be referred to as a "programming language" is a formal computing language that specifies a set of instructions to that can be used to produce various kinds of output. The language may include a specific set of semantics that include instructions executable by a processing resource to cause a computing system to perform one or more tasks or functions.

One shortcoming associated with some approaches to building applications may arise when updates are propagated from source code to running instances of an application. For example, developers may have difficulty in building the entire application locally because the application build process may include the use of various operating systems, languages (e.g., sets of semantics), software development kits (SDKs), and/or building tools. In addition, different versions of the application may be difficult to resolve (e.g., integrate), especially when building the application locally and propagating the newly built (or updated) application to running instances of the application across multiple computing instances such as multiple VSCIs. Further, if the developer attempts to make changes in the local build, it may be difficult to propagate the changes to a continuous integration/continuous delivery (CI/CD) system.

In contrast, embodiments herein may allow for the application building process to be modularized, abstracted, and/or "containerized" by utilizing one or more VSCIs as part of the application building process. For example, embodiments herein may allow for applications to be built utilizing VSCI management tools. In some embodiments, applications may be built using VSCI management tools combining multiple languages (e.g., sets of semantics) in the same application. Further, embodiments herein may allow for uniform building of applications, which may provide increased reproduction of applications in contrast to some approaches. In addition, as described in more detail herein, embodiments may allow for the application build process to be simplified, optimized, and/or may provide increased reproducibility in comparison with some previous approaches.

As applications become increasingly complex, polyglot programming (e.g., application building in which multiple programming languages are used in a single application)

may be utilized to allow developers or DevOps to "pick the right tool for the job." For example, a particular programming language may offer some benefits in some situations while a different programming language may offer some other benefits in some other situations. By utilizing polyglot programming, programming languages can be selected to maximize the benefits offered by each programming language used with respect to building an application. However, combining different programming languages (or different version of a particular programming language) when building an application may include utilization of multiple building tools, SDKs, frameworks, command-line interfaces (CLIs), etc., which may increase the complexity of managing the application build process. In addition, building applications using polyglot programming may increase the complexity of orchestrating the different programming languages in order to build an application that functions as intended.

In addition to the increased complexity associated with combining, managing, and/or orchestrating multiple programming languages in a single application build, there may also be increased time costs associated therewith. For example, the additional management and/or orchestration utilized in the application build may take longer than traditional (e.g., non-polyglot) approaches to building applications. Further, when multiple programming languages are used in a single application build, the management and/or orchestration involved may be error-prone. For example, developers and DevOps may introduce errors in to the application in the course of combining the multiple programming languages (and using multiple building tools, SDKs, etc.), which may difficult to trace and/or remedy, and which may lead to applications being built that are difficult to reproduce due to variations in the techniques employed by the developers and DevOps in tracing and/or remedying errors introduced to the applications.

In contrast, embodiments herein may allow for applications to be built using VSCIs. For example, in some embodiments, multiple VSCI images corresponding to respective configuration files may be deployed on respective VSCIs. The VSCI images may be preconfigured VSCIs (e.g., preconfigured Docker images, etc.), which may be used to generate (e.g., build) one or more configuration files or (portions thereof). As described in more detail herein, the build configuration may be deployed to generate one or more build artifacts (e.g., an application, portions of an application, complex data objects that are generated during the application building process, etc.). In some embodiments, the build artifacts and/or the build configuration may be utilized to generate an application.

Further, embodiments herein may eliminate maintenance of multiple build tools locally. In addition, embodiments herein may allow for applications to be built anywhere by exploiting capabilities of a software defined data center. In some embodiments, it may further be possible to provide builds that depend on different versions of a same technology (e.g., Java 7 and Java 8), which may be difficult using some approaches that utilize a local dev environment. For example, a common build tool may not exist that can operate under a polyglot programming approach, in contrast to embodiments herein.

An example application build automation system can include a management engine configured to receive a first set of definitions corresponding to a first configuration file, receive a second set of definitions corresponding to a second configuration file, generate a first VSCI image using the first configuration file, and generate a second VSCI image using the second configuration file. The example system may further include a build engine configured to receive the first VSCI image and the second VSCI image, generate a build configuration based on the first VSCI image and the second VSCI image, and deploy the build configuration to generate a plurality of build artifacts.

In some examples, a plurality of VSCI images may be used to generate a build file for a single application (e.g., a single configuration file); however, in some embodiments, a plurality of configuration files may be processed in parallel. For example, a plurality of VSCIs that correspond to a single configuration file may be executed to produce a single build (e.g., configuration file). In some embodiments, a plurality of builds (e.g., configuration files) may be processed concurrently.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host for application build automation according to a number of embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center (SDDC) can include software defined networking and/or software defined storage. In some embodiments, components of a software defined data center can be provisioned, operated, and/or managed through an application programming interface (API).

The host 102 can execute a number of VSCIs 106-1, 106-2, . . . , 106-N (referred to generally herein as "VSCIs 106"). The VSCIs 106 can be provisioned with processing resources 108 and/or memory resources 110 and can communicate via the network interface 112. The processing resources 108 and the memory resources 110 provisioned to the VSCIs 106 can be local and/or remote to the host 102. For example, in a software defined data center, the VSCIs 106 can be provisioned with resources that are generally available to the software defined data center and not tied to any particular hardware device. As a result, in some embodiments, the VSCIs may ultimately be executed by the processing resource 108 even if the processing resource 108 is in a different physical location than a location in which the VSCIs 106 are executed. By way of example, the memory resources 110 can include volatile and/or non-volatile memory available to the VSCIs 106. In some embodiments, the VCIs 106 can be moved to different hosts (not specifically illustrated), such that a different host executes the VSCIs 106.

Figure 2:
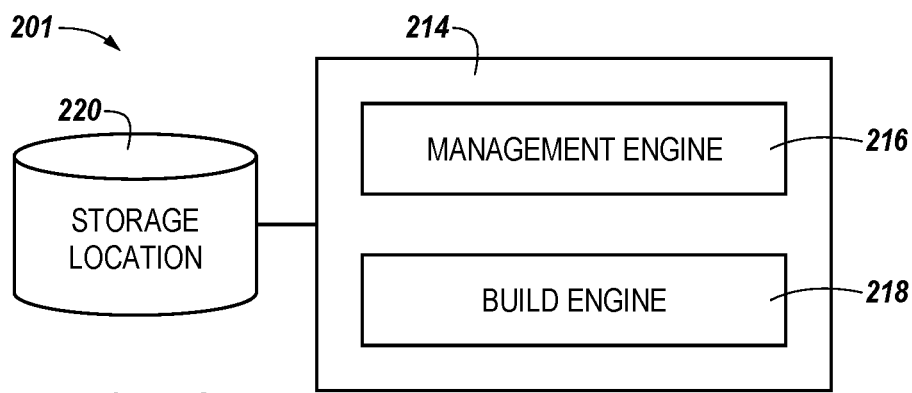
FIG. 2 is a diagram of a computing system for application build automation according to a number of embodiments of the present disclosure.

FIG. 2 is a diagram of a computing system for application build automation according to a number of embodiments of the present disclosure. The system 201 can include a storage location 220 and a subsystem 214. The subsystem 214 can include a number of engines, for example management engine 216 and/or build engine 218, and can be in communication with the storage location 220 via a communication link. The system 201 can include additional or fewer engines than illustrated to perform the various functions described herein. The system 201 can represent program instructions and/or hardware of a machine (e.g., machine 317 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. Further, as used herein, "management engine" and "build engine" refer to a portion of a pool of physical processing resources (e.g., processing resources 108 illustrated in FIG. 1).

The number of engines can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the management engine 216 can include a combination of hardware and program instructions that is configured to provide application build automation using the VSCIs 106. In some embodiments, application build automation can be facilitated with information acquired from the storage location 220, which can be external to the subsystem 214. As described in more detail in connection with FIG. 4, herein, the management engine 216 can include a combination of hardware and program instructions to receive a first set of definitions corresponding to a first configuration file and/or receive a second set of definitions corresponding to a second configuration file. In some embodiments, the management engine 216 and/or the build engine 218 (described in more detail below) may be analogous to the build automation engine 436 illustrated in FIG. 4, herein.

In some embodiments, the build engine 218 can include a combination of hardware and program instructions that are configured to receive a first VSCI image and a second VSCI image, and generate a build configuration based on the first VSCI image, the first configuration file, the second VSCI image, and the second configuration file, and/or deploy the build configuration to generate a plurality of build artifacts, as described in more detail in connection with FIG. 4, herein. In some embodiments, the first VSCI image and/or the second VSCI image may be preconfigured VSCI images (e.g., preconfigured container images) that may be provided by the management engine 216. Embodiments are not limited to examples in which there is a first VSCI image and a second VSCI image; however, and more than two VSCI images provided.

The build engine 218 can include a combination of hardware and program instructions that are configured to deploy the build configuration to generate an application using the build configuration and the plurality of build artifacts. In some embodiments, the build engine 218 can include a combination of hardware and program instructions that are configured to generate a first virtualized, self-contained computing instance (VSCI) on which to execute the first configuration file and/or generate a second virtualized, self-contained computing instance on which to execute the second configuration file. As described in further detail in connection with FIG. 4, herein, the build engine 218 can further include a combination of hardware and program instructions that are configured to determine that an application has been generated using the build configuration and abort execution of the first virtualized, self-contained computing instance and the second virtualized, self-contained computing instance responsive to the determination. Embodiments are not limited to examples in which a first VSCI and a second VSCI are generated; however, and the build engine 218 can include a combination of hardware and program instructions that are configured to generate a plurality of VSCIs.

Figure 3:
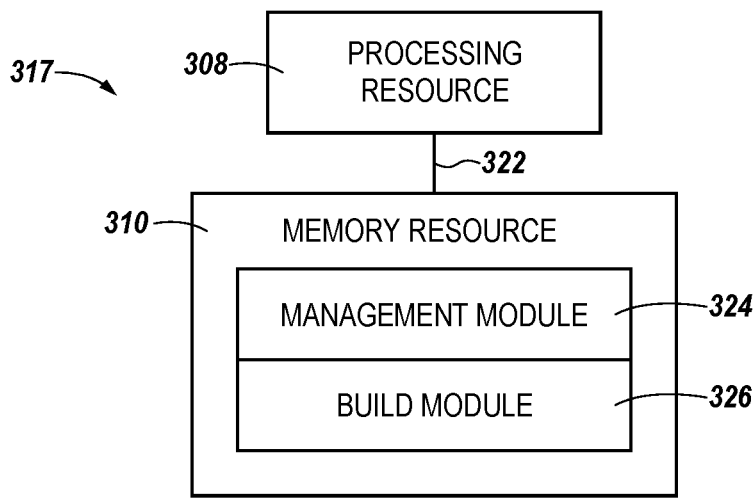
FIG. 3 is a diagram of a machine for application build automation according to a number of embodiments of the present disclosure.

FIG. 3 is a diagram of a machine for application build automation according to a number of embodiments of the present disclosure. The machine 317 can utilize software, hardware, firmware, and/or logic to perform a number of functions. The machine 317 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 317 (e.g., the machine 317 can include internal memory resources and have access to external memory resources). In some embodiments, the machine 317 can be a VCI. The program instructions (e.g., machine-readable instructions (MM)) can include instructions stored on the MRM to implement a particular function. The set of MRI can be executable by one or more of the processing resources 308. The memory resources 310 can be coupled to the machine 317 in a wired and/or wireless manner. For example, the memory resources 310 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 322. The communication path 322 can be local or remote to the machine 317. Examples of a local communication path 322 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 322 can be such that the memory resources 310 are remote from the processing resources 308, such as in a network connection between the memory resources 310 and the processing resources 308. That is, the communication path 322 can be a network connection. Examples of such a network connection can include a local area network (LAN), wide area network (WAN), personal area network (PAN), and the Internet, among others.

As shown in FIG. 3, the MM stored in the memory resources 310 can be segmented into a number of modules 324, 326 that when executed by the processing resources 308 can perform a number of functions. As used herein a module includes a set of instructions included to perform a particular task or action. The number of modules 324, 326 can be sub-modules of other modules. For example, the management module 324 can be a sub-module of the build module 326. Furthermore, the number of modules 324, 326 can comprise individual modules separate and distinct from one another. Examples are not limited to the specific modules 324, 326 illustrated in FIG. 3.

Each of the number of modules 324, 326 can include program instructions and/or a combination of hardware and program instructions that, when executed by a processing resource 308, can function as a corresponding engine as described with respect to FIG. 2. For example, the management module 324 can include program instructions and/or a combination of hardware and program instructions that, when executed by a processing resource 308, can function as the management engine 216 and/or the build module 326 can include program instructions and/or a combination of hardware and program instructions that, when executed by a processing resource 308, can function as the build engine 218.

The machine 317 can include management module 324, which can include instructions to receive a first set of definitions corresponding to a first configuration file and/or receive a second set of definitions corresponding to a second configuration file. Based on these definitions, the management module 324 may generate instructions for the build module 326. In some embodiments, the build module can be located on another machine that is accessible via a network. The instructions for the build module may contain some metadata for the build and/or instructions to deploy VSCIs images (e.g., VSCI images 438-1, . . . , 438-N illustrated in FIG. 4, herein). The VSCIs images (e.g. Docker container images) may function as templates that may contain a snapshot of a ready-to-boot minimal operating system with a single specific task configured (e.g. a webserver that will serve a specific web page). In some embodiments, these images can be pulled from a registry (e.g., a private registry) and/or they can be pushed by the management module 324. For example, in some embodiments, the VSCI images may provide a template for a VSCI (e.g., VSCIs 406-1, . . . , 406-N illustrated in FIG. 4, herein) that are deployed to provide application build automation.

The machine 317 can further include a build module 326, which can include instructions to receive a first VSCI image and/or receive a second VSCI image. In some embodiments, the build module 326 can further include instructions to receive the first VSCI image and the second VSCI image and generate a build configuration based on the first VSCI image and the second VSCI image, and/or deploy the build configuration to generate a plurality of build artifacts. Although described above as a first VSCI image and a second VSCI image, embodiments are not so limited, and the build module 326 can include instructions to receive more than two VSCI images.

In some embodiments, the management module 324 and/or the build module 326 can further include instructions to generate the VSCI images during a lifecycle of one or more VSCIs (e.g., VSCIs 406-1, . . . , 406-N illustrated in FIG. 4, herein) to deploy the VSCIs. When all the VSCIs have terminated operation, build artifacts (e.g., build artifacts 439 illustrated n FIG. 4, herein) may be made available to the storage location 220 illustrated in FIG. 2, or the storage volume 437 illustrated in FIG. 4.

Figure 4:
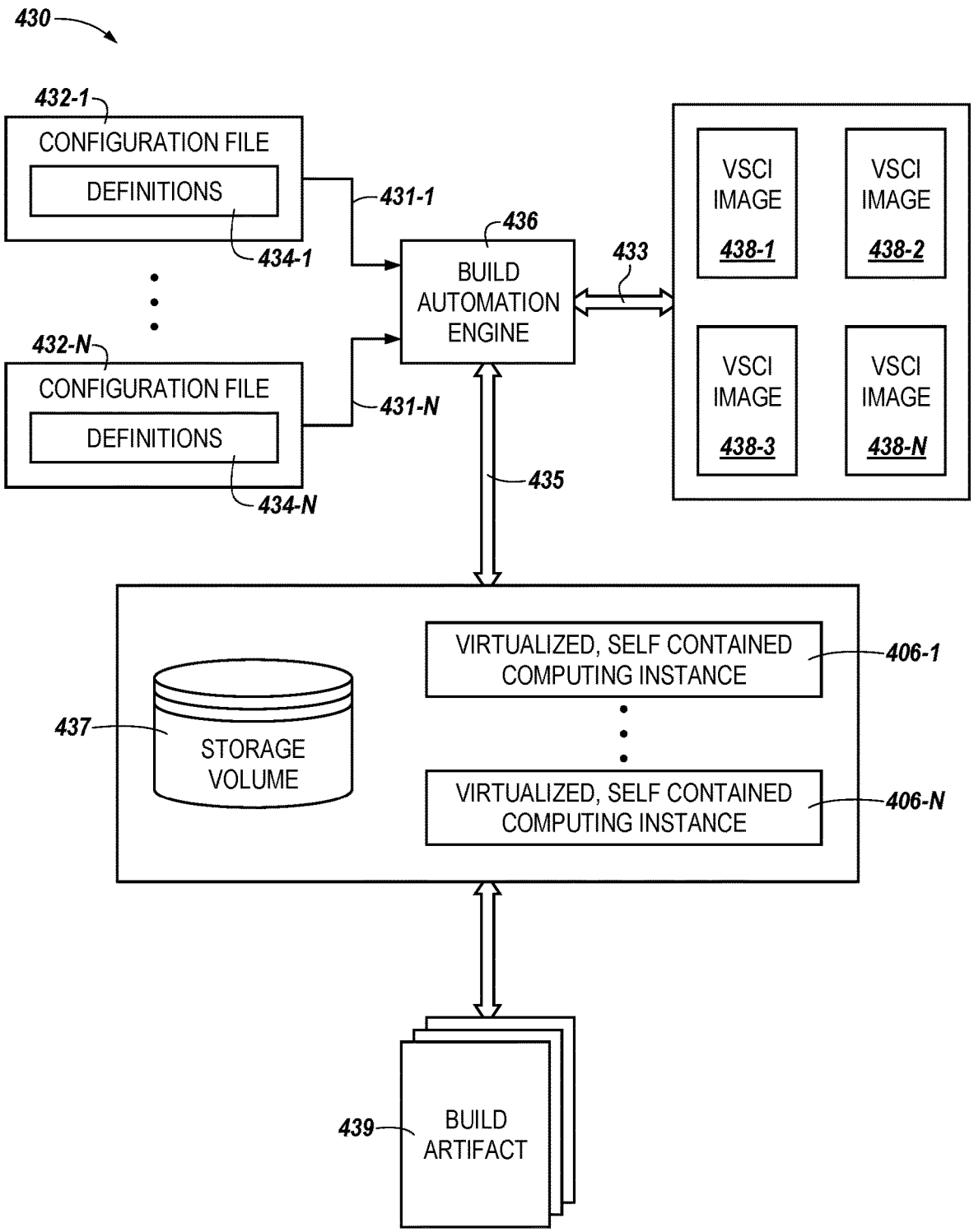
FIG. 4 is a diagram of a system for application build automation according to a number of embodiments of the present disclosure.

FIG. 4 is a diagram of a system for application build automation according to a number of embodiments of the present disclosure. The system 430 includes a plurality of configuration files 432-1, . . . , 432-N which may be transferred to the build automation engine 436 as indicated by the communication links 431-1, . . . , 431-N. As shown in FIG. 4, each of the configuration files 432-1, . . . , 432-N may include one or more definitions 434-1, . . . , 434-N. The system 430 may include a plurality of VSCI images 438-1, . . . , 438-N. The plurality of VSCI images 438-1, . . . , 438-N may be transferred to the build automation engine 436 via a communication link 433. In some embodiments, the build automation engine 436 may be analogous to system 201 and/or the subsystem 214 illustrated in FIG. 2, and/or the build automation engine 436 may be analogous to the machine 317 illustrated in FIG. 3.

The plurality of VSCI images may be available in a private registry, a public registry, and/or may be bundled within the build automation engine 436 and/or the management engine 216 illustrated in FIG. 2, herein. In some embodiments, the VSCI images may be pushed on demand to the build engine 218 illustrated in FIG. 2, herein. In some embodiments, the registry or registries may be a specialized storage location for VSCI images.

The build automation engine 436 may be coupled to a storage volume 437 (e.g., a build storage volume) and/or one or more virtual, self-contained computing instances (VSCIs) 406-1, . . . , 406-N. The VSCIs 406-1, . . . , 406-N may be analogous to VSCIS 106-1, . . . , 106-N illustrated in FIG. 1. In some embodiments, as described in more detail herein, the VSCIs 406-1, . . . , 406-N and/or the storage volume 437 may be utilized to generate build artifacts 439 as indicated by the communication link 435.

In some embodiments, the configuration files 432-1, . . . , 432-N may be created by a developer or DevOps. A developer may provide definitions 434-1, . . . , 434-N in the configuration files 432-1, . . . , 432-N that describe how the configuration files 432-1, . . . , 432-N behave. The definitions 434-1, . . . , 434-N may correspond to instructions to determine and/or access a source code repository the configuration files 432-1, . . . , 432-N may utilize in operation. As used herein, a "source code repository" is a file archive containing source code that may be made available for use by one or more computing devices in a SDDC or other wired or un-wired computing environment. In some embodiments, the definitions 434-1, . . . , 434-N may correspond to instructions to determine and/or access a source path associated with one or more configuration files 432-1, . . . , 432-N, a VSCI image 438-1, . . . , 438-N, a build automation engine 436, a storage volume 437, and/or one or more of the VSCIs 406-1, . . . , 406-N. In some embodiments, the definitions 434-1, . . . , 434-N may refer to "calls" to source code that may be stored in a remote location (e.g., source code that may be stored in a data center remotely located from the computing environment on which the system 430 is deployed) and/or the source code may be executable by but that may be accessible to the system 430; however, embodiments are not so limited, and the definitions 434-1, . . . , 434-N may be stored on the storage volume 437 and/or the memory resources such as memory resources 110 illustrated in FIG. 1, herein.

The configuration files 432-1, . . . , 432-N can include instructions written in a data serialization language such as YAML®, JavaScript Object Notation (JSON), or other suitable data serialization languages. In some embodiments, the instructions contained in the configuration files 432-1, . . . , 432-N can be transferred to the build automation engine 436. The build automation engine 436 may include a combination of hardware and software, but at least hardware configured to perform orchestration, scheduling, and/or storage for instructions (e.g., VSCI images 438-1, . . . , 438-N) received thereto. The build automation engine 436 may be a container management solution such as a container management platform. As used herein, a "container management platform" is hardware and/or software but at least hardware configured to facilitate the organization of VSCIs 406-1, . . . , 406-N. The container management platform may be configured to automate creation, destruction, deployment, and/or scaling of VSCIs 406-1, . . . , 406-N.

In some embodiments, the configuration files 432-1, . . . , 432-N may include information that describes the application (or build artifacts 439) to be built. For example, the configuration files 432-1, . . . , 432-N can include repository information (e.g., Git repository information), source path information, programming languages, build commands, etc. The configuration files 432-1, . . . , 432-N can be provided in a plain format such as a Docker Compose format or other plain format.

In some embodiments, the build automation engine 436 may be configured to receive the configuration files 432-1, . . . , 432-N and/or translate the configuration files 432-1, . . . , 432-N and respective definitions 434-1, . . . , 434-N into one or more VSCI images 438-1, . . . , 438-N. The VSCI images 438-1, . . . , 438-N may include respective predefined sets of mapping rules which may provide an indication of the type of instructions associated with each VSCI image 438-1, . . . , 438-N. In some embodiments, the VSCI images 438-1, . . . , 438-N may each include instructions that correspond to different libraries, which may be used by different programming languages. For example, VSCI image 438-1 may include instructions associated with the Git distributed version control system (e.g., the VSCI image 438-1 may be configured to interpret Git commands), VSCI image 438-2 may include instructions associated with the Java programming language, VSCI image 438-3 may include instructions associated with the Go programming language, and/or VSCI image 438-N may include instructions associated with the C or C++ programming language. Embodiments are not limited to these specific examples, however, and the VSCI images 438-1, . . . , 438-N may include instructions that correspond to other suitable programming languages.

In some embodiments, one or more of the VSCI images 438-1, . . . , 438-N may include pre-built VSCI images. The VSCI images 438-1, . . . , 438-N can correspond to VSCIs that are configured to build one or more pieces of the build artifacts 439 or application. In some embodiments, each VSCI image 438-1, . . . , 438-N can correspond to different programming languages. For example, one VSCI image 438-1, . . . , 438-N may correspond to instructions written in an initial project Git checkout, another VSCI image 438-1, . . . , 438-N may correspond to instructions written in Java, another VSCI image 438-1, . . . , 438-N may correspond to instructions written in Golang, another VSCI image 438-1, . . . , 438-N may correspond to instructions written in C/C++, etc.

The VSCI images 438-1, . . . , 438-N and/or the VSCIs 406-1, . . . , 406-N may be "lightweight" VSCIs. As used herein, a "lightweight" VSCI includes only the minimum required components to complete a particular task. For example, a lightweight VSCI may only include libraries, SDKs, CLIs, etc. to complete a particular task. In some embodiments, the VSCIs 406-1, . . . , 406-N and/or the VSCI images 438-1, . . . , 438-N may be configured such that they do not maintain their state after completion of their particular task or function. For example, in some embodiments, the build artifacts 439 may be directly transferred to shared storage volumes (as opposed to the storage volume 437).

The build automation engine 436 may be configured to deploy the VSCI images 438-1, . . . , 438-N to generate one or more build artifacts 439. For example, the build automation engine 436 may cause the VSCI images 438-1, . . . , 438-N to be deployed on the VSCIs 406-1, . . . , 406-N to generate one or more build artifacts 439. As used herein, an "artifact" is an application and/or a complex data object that is generated as part of an application building process. In some embodiments, the VSCIs 406-1, . . . , 406-N may use the storage volume 437 to store portions of the VSCI images 438-1, . . . , 438-N during the process of generating the build artifact(s) 439.

As discussed above, the build automation engine 436 and/or the management engine 216 illustrated in FIG. 2, may be configured to control deployment and/or execution of the VSCIs 406-1, . . . , 406-N. For example, the build automation engine 436 may be configured to cause the VSCIs 406-1, . . . , 406-N to be deployed and/or executed in a particular order or at particular times. This may allow for the VSCIs 406-1, . . . , 406-N to be deployed or executed taking into account dependencies between the VSCI images 438-1, . . . , 438-N, as described in more detail below.

In some embodiments, the configuration files 432-1, . . . , 432-N and/or the VSCIs 406-1, . . . , 406-N may exhibit one or more dependencies on each other. For example, a particular VSCI (or configuration file) such as VSCI 406-1 may depend on a different VSCI (or configuration file) such as VSCI 406-N. A dependency may refer to a condition in which one of the VSCIs (e.g., VSCI 406-1) may be deployed or executed subsequent to deployment or execution of the VSCI (e.g., VSCI image 406-N) from which it depends. Accordingly, in some embodiments, one or more of the VSCIs 406-1, . . . , 406-N may be deployed or executed prior to one or more of the other VSCIs 406-1, . . . , 406-N being deployed or executed. Embodiment are not so limited, however, and in some embodiments, one or more of the VSCI 406-1, . . . , 406-N may be deployed and/or executed in parallel.

As an example, VSCI 406-1 may generate a first build artifact 439 and cause the first build artifact 439 to be stored in the storage volume 437. The first build artifact may be needed in order for the VSCI 406-N to complete an operation. As a result, VSCI 406-N may wait for termination of VSCI 406-1 (when the first build artifact 439 is published in the storage volume 437). In some embodiments, VSCI 406-N may not be deployed until VSCI 406-1 has been terminated, or VSCI 406-N may be deployed in parallel with VSCI 406-1, but may wait to execute instructions associated therewith until VSCI 406-1 is terminated.

For example, the build automation engine 436 may be configured to determine that one or more of the VSCI 406-1, . . . , 406-N is to be deployed or executed prior to a different one or more of the VSCI 406-1, . . . , 406-N being deployed or executed based on dependencies between the VSCIs 406-1, . . . , 406-N. In response, the build automation engine 436 may be configured to deploy the VSCIs 406-1, . . . , 406-N in a particular order based on the determined dependencies between the VSCIs 406-1, . . . , 406-N. For example, the build automation engine 436 may be configured to control which VSCI 406-1, . . . , 406-N is deployed or executed and in what order the VSCIs 406-1, . . . , 406-N are deployed or executed based on the determined dependencies between the VSCIs 406-1, . . . , 406-N (or the configuration files 432-1, . . . , 432-N).

In an example implementation, the build automation engine 436 may be configured to read one or more of the configuration files 432-1, . . . , 432-N and determine that the configuration file 432-1, . . . , 432-N includes instructions written in a particular programming language (e.g., Java, C/C++, Go, etc.). The build automation engine 436 may be further configured to determine that the configuration file 432-1, . . . , 432-N is to be built using information associated with a repository command (e.g., a Maven command, etc.).

The build automation engine 436 may be further configured to select a VSCI image 438-1, . . . , 438-N from a repository of VSCI images 438-1, . . . , 438-N that corresponds to the particular programming language. In some examples, the build automation engine 436 may be further configured to deploy a VSCI 406-1, . . . , 406-N based on the VSCI image 438-1, . . . , 438-N. In this example, the build automation engine 436 may be configured to execute the repository command for the particular programming language sources within the VSCI image 438-1, . . . , 438-N. After the build automation engine 436 executes the repository command(s) within the VSCI image 438-1, . . . , 438-N, a build artifact 439 for a given configuration file 432-1, . . . , 432-N may be stored in the storage volume 437 for future access.

Figure 5:
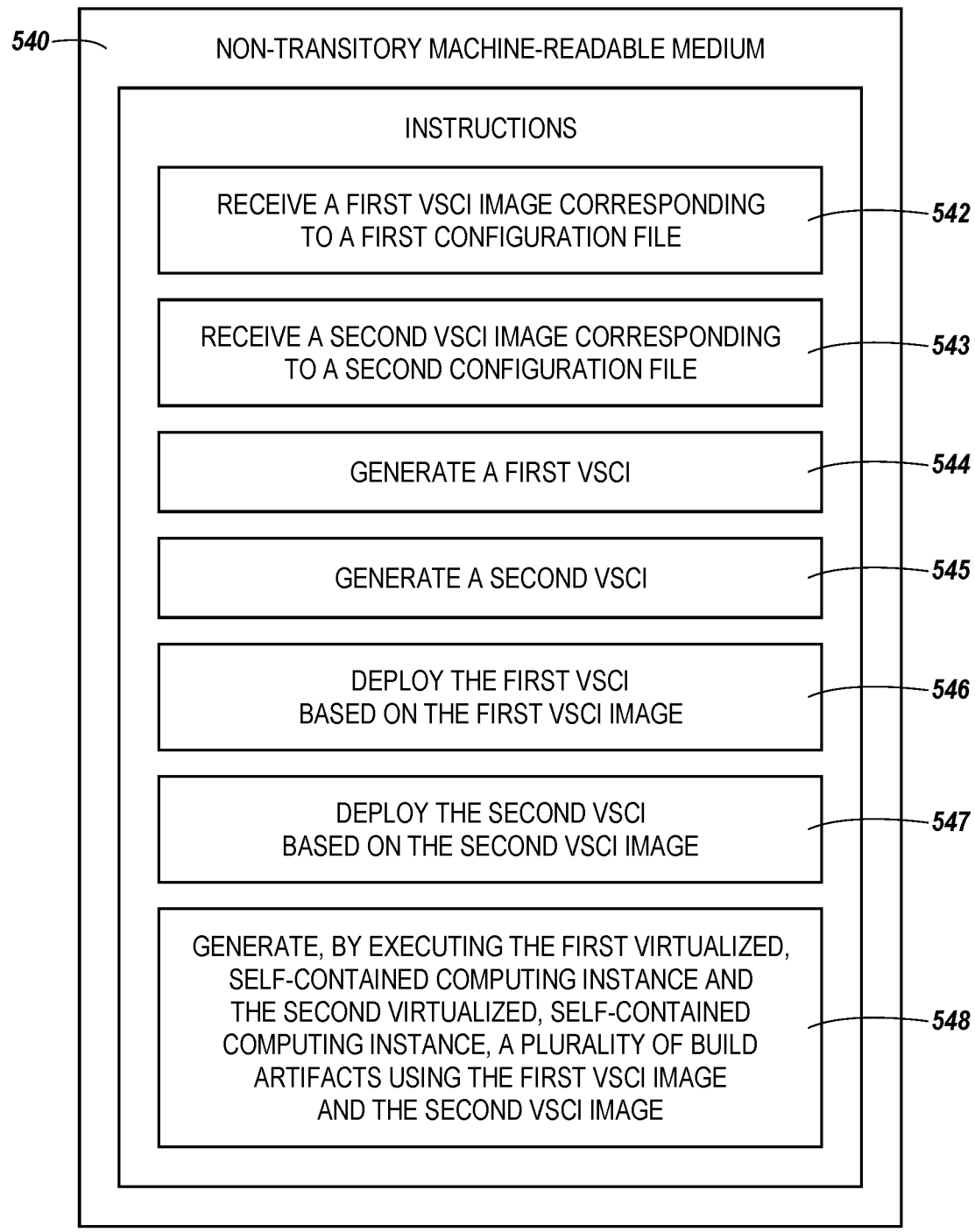
FIG. 5 is a diagram of a non-transitory machine-readable medium for application build automation according to a number of embodiments of the present disclosure.

FIG. 5 is a diagram of a non-transitory machine-readable medium 540 for application build automation according to a number of embodiments of the present disclosure. The non-transitory machine-readable medium 540 may include a plurality of instructions 542, 543, 544, 545, 546, 547, 548, which may be executable a processing resource (e.g., processing resource 108 illustrated in FIG. 1, processing resource 308 illustrated in FIG. 3, etc.). The instructions 542 may be executable by the processing resource to receive a first VSCI image corresponding to a first configuration file. The first configuration file may be analogous to one of the configuration files 432-1, . . . , 432-N illustrated in FIG. 4, while the first VSCI image may be analogous to one of the VSCI images 438-1, . . . , 438-N illustrated in FIG. 4, herein.

In some embodiments, the instructions 543 may be executable by the processing resource to receive a second VSCI image corresponding to a second configuration file. The second configuration file may be analogous to one of the configuration files 432-1, . . . , 432-N illustrated in FIG. 4, while the second VSCI image may be analogous to one of the VSCI images 438-1, . . . , 438-N illustrated in FIG. 4, herein. Although described above as a first VSCI image and a second VSCI image, embodiments are not so limited, and the instructions may be executable by the processing resource to generate any number (e.g., more than two) of VSCI images.

The non-transitory machine-readable medium 540 may include instructions 544, which may be executable by a processing resource to generate a first virtualized, self-contained computing instance (VSCI). The first VSCI may correspond to one of the VSCIs 106-1, . . . , 106-N illustrated in FIG. 1, or may correspond to one of the VSCIs 406-1, . . . , 406-N illustrated in FIG. 4, herein. In some embodiments, the instructions may be executable by the processing resource to generate more than one VSCI. Although described above as a first VSCI and a second VSCI, embodiments are not so limited, and the instructions may be executable by the processing resource to generate any number (e.g., more than two) of VSCIs.

The non-transitory machine-readable medium 540 may include instructions 545, which may be executable by a processing resource to generate a second virtualized, self-contained computing instance (VSCI). The second VSCI may correspond to one of the VSCIs 106-1, . . . , 106-N illustrated in FIG. 1, or may correspond to one of the VSCIs 406-1, . . . , 406-N illustrated in FIG. 4, herein.

In some embodiments, the non-transitory machine-readable medium 540 may include instructions 546, which may be executable by the processing resource to deploy the first VSCI based on the first VSCI image (e.g., VSCI images 438-1, . . . , 438-N illustrated in FIG. 4, herein). For example, the non-transitory machine-readable medium 540 may include instructions 546, which may be executable by the processing resource to execute a particular VSCI based on a particular VSCI image.

The non-transitory machine-readable medium 540 may further include instructions 547, which may be executable by the processing resource to deploy the second VSCI based on the second VSCI image. For example, the non-transitory machine-readable medium 540 may include instructions 547, which may be executable by the processing resource to execute a particular VSCI based on a particular VSCI image.

In some embodiments, the non-transitory machine-readable medium 540 may further include instructions 548, which may be executable by the processing resource to generate, by executing the first VSCI and the VSCI, a plurality of build artifacts using the first VSCI image and the second VSCI image. The plurality of build artifacts may correspond to build artifact(s) 439 illustrated in FIG. 4, herein. In some embodiments, the instructions may be executable by the processing resource to generate an application using the plurality of build artifacts by executing the first VSCI and the second VSCI using the first VSCI image and the second VSCI image. In some embodiments, the non-transitory machine-readable medium 540 may include instructions executable by the processing resource to transfer the plurality of build artifacts directly to a shared storage volume (e.g., storage volume 435 illustrated in FIG. 4) upon completion of execution of the first VSCI and the second VSCI. In some embodiments, by executing a plurality of VSCIs that correspond to a single configuration file, the instructions may be executed by the processing resource to produce build artifacts for a single build (configuration file). In some embodiments, multiple builds can be processed concurrently.

The non-transitory machine-readable medium 540 may further include instructions, which may be executable by the processing resource to abort execution of the first VSCI and the second VSCI in response to generation of the plurality of build artifacts. For example, once the first VSCI and the second VSCI have been executed to generate the plurality of VSCI images and/or once the first VSCI and the second VSCI have been executed to generate the application using the plurality of artifacts, execution of the first VSCI and the second VSCI may be aborted. In some embodiments, aborting execution of the first VSCI and the second VSCI subsequent to generating the plurality of build artifacts (or application), may allow for the system to be automatically cleaned up, thereby freeing up resources for other activity.

In some embodiments, the instructions may include instructions executable by the processing resource to generate the first VSCI image according to a first set of semantics and generate the second VSCI image according to a second set of semantics. For example, the first VSCI image may be generated such that it includes instructions in a first programming language and the second VSCI image may be generated such that it includes instructions in a second programming language.

The non-transitory machine-readable medium 540 may include instructions executable by the processing resource to determine at least one dependency between the first VSCI and the second VSCI. For example, the instructions may be executable by the processing resource to determine that one of the first VSCI and the second VSCI contain instructions (e.g., semantics associated with the respective VSCI images of the first VSCI and the second VSCI) is to be executed (e.g., compiled) prior to execution of the other VSCI. In some embodiments, the non-transitory machine-readable medium 540 may include instructions to execute the first VSCI and the second VSCI in a particular order based on the at least one dependency between the first VSCI and the second VSCI.

Figure 6:
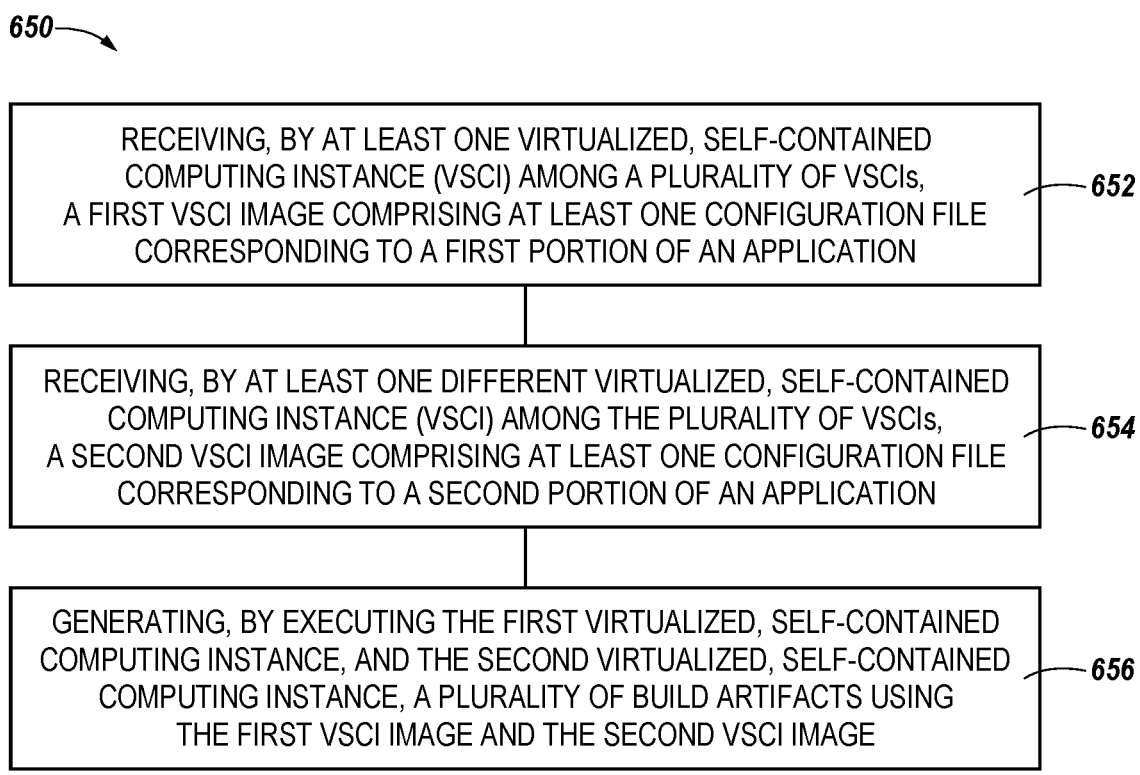
FIG. 6 is a flow chart illustrating a method for application build automation according to a number of embodiments of the present disclosure.

FIG. 6 is a flow chart illustrating a method 650 for application build automation according to a number of embodiments of the present disclosure. At block 652, the method 650 may include receiving, by at least one virtualized, self-contained computing instance (VSCI) among a plurality of VSCIs, a first VSCI image comprising at least one configuration file corresponding to a first portion of an application. The first VSCI image may correspond to a first portion of an executable application.

At block 654, the method 650 may include receiving, by at least one different VSCI among the plurality of VSCIs, a second VSCI image comprising at least one configuration file corresponding to a second portion of an application. The second VSCI image may correspond to a second portion of the executable application.

At block 656, the method 650 may include generating, by executing the first virtualized, self-contained computing instance and the second virtualized, self-contained computing instance, a plurality of build artifacts using the first VSCI image and the second VSCI image. In some embodiments, the first virtualized, self-contained computing instance is configured to execute instructions according to a first set of semantics and the second virtualized, self-contained computing instance is configured to execute instructions according to a second set of semantics.

The first virtualized, self-contained computing instance may be generated by generating a first lightweight container, and the second virtualized, self-contained computing instance may be generated by generating a second lightweight container. The first lightweight container and the second lightweight container may be configured to not maintain a state associated therewith.

As describe above, each configuration file may correspond to a particular application build process. Any number of VSCIs may be utilized in the application build process. In some embodiments, the artifacts may be produced by executing all of the VSCIs.

The method 650 may include determining, prior to executing the first virtualized, self-contained computing instance and the second virtualized, self-contained computing instance, the second virtualized, self-contained computing instance has at least one dependency on the first virtualized, self-contained computing instance, and executing the second virtualized, self-contained computing instance prior to executing the first virtualized, self-contained computing instance based on the determination.

In some embodiments, the method 650 may further include aborting execution of the first virtualized, self-contained computing instance and the second virtualized, self-contained computing instance responsive to a determination that the application has been generated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An application build automation system, comprising:
    a management engine configured to:
        receive a first set of definitions corresponding to a first configuration file of a first application build process;
        receive a second set of definitions corresponding to a second configuration file of a second application build process; and
    a build engine configured to:
        receive a first virtualized, self-contained computing instance (VSCI) image and a second VSCI image;
        generate a build configuration, including:
            a first virtualized, self-contained computing instance based on the first VSCI image and first configuration file to execute the first configuration file of the first application build process; and
a second virtualized, self-contained computing instance based on the second VSCI image and the second configuration file to execute the second configuration file of the second application build process; and
deploy the build configuration to generate a plurality of build artifacts.

2. The system of claim 1, wherein the build engine is further configured to deploy the build configuration to generate an application using the build configuration and the plurality of build artifacts.

3. The system of claim 1, wherein the build engine is further configured to:
determine that an application has been generated using the build configuration; and
abort execution of the first virtualized, self-contained computing instance and the second virtualized, self-contained computing instance responsive to the determination.

4. The system of claim 1, wherein the first virtualized, self-contained computing instance and the second virtualized, self-contained computing instance are lightweight self-contained computing instances.

5. The system of claim 1, wherein the first virtualized, self-contained computing instance and the second virtualized, self-contained computing instance are non-persistent computing instances.

6. The system of claim 1, wherein the first virtualized, self-contained computing instance and the second virtualized, self-contained computing instance are configured to directly transfer the plurality of build artifacts to a shared storage volume upon completion of generation of the plurality of build artifacts.

7. The system of claim 1, wherein the first configuration file operates according to a first set of semantics and the second configuration file operates according to a second set of semantics.

8. The system of claim 1, wherein the plurality of build artifacts comprise portions of an executable application.

9. A non-transitory machine-readable medium storing instructions executable by a processing resource to:
receive a first virtualized, self-contained computing instance (VSCI) image corresponding to a first configuration file of a first application build process;
receive a second VSCI image corresponding to a second configuration file of a second application build process;
generate a first virtualized, self-contained computing instance to execute the first configuration file of the first application build process;
generate a second virtualized, self-contained computing instance to execute the second configuration file of the second application build process;
deploy the first virtualized, self-contained computing instance based on the first VSCI image;
deploy the second virtualized, self-contained computing instance based on the second VSCI image; and
generate, by executing the first virtualized, self-contained computing instance and the second virtualized, self-contained computing instance, a plurality of build artifacts using the first VSCI image and the second VSCI image.

10. The non-transitory machine-readable medium of claim 9, wherein the instructions are further executable by the processing resource to generate an application by executing the first virtualized, self-contained computing instance and the second virtualized, self-contained computing instance using the first VSCI image and the second VSCI image.

11. The non-transitory machine-readable medium of claim 9, wherein the instructions are further executable by the processing resource to abort execution of the first virtualized, self-contained computing instance and the second virtualized, self-contained computing instance in response to generation of the plurality of build artifacts.

12. The non-transitory machine-readable medium of claim 9, wherein the first VSCI image comprises a first set of semantics, and wherein the second VSCI image comprises a second set of semantics.

13. The non-transitory machine-readable medium of claim 9, wherein the instructions are further executable by the processing resource to:
determine at least one dependency between the first virtualized, self-contained computing instance and the second virtualized, self-contained computing instance; and
execute the first virtualized, self-contained computing instance and the second virtualized, self-contained computing instance in a particular order based on the at least one dependency between the first virtualized, self-contained computing instance and the second virtualized, self-contained computing instance.

14. The non-transitory machine-readable medium of claim 9, wherein the instructions are further executable by the processing resource to transfer the plurality of build artifacts directly to a shared storage volume upon completion of execution of the first virtualized, self-contained computing instance and the second virtualized, self-contained computing instance.

15. A method for application build automation, comprising:
receiving, by at least one first virtualized, self-contained computing instance (VSCI) among a plurality of virtualized, self-contained computing instances, a first VSCI image comprising at least one configuration file corresponding to a first application build process of a first portion of an application;
receiving, by at least one different virtualized, self-contained computing instance among the plurality of virtualized, self-contained computing instances, a second VSCI image comprising at least one configuration file corresponding to a second application build process of a second portion of an the application; and
generating, by executing the first virtualized, self-contained computing instance and the second virtualized, self-contained computing instance, a plurality of build artifacts using the first VSCI image and the second VSCI image.

16. The method of claim 15, further comprising aborting execution of the first virtualized, self-contained computing instance and the second virtualized, self-contained computing instance responsive to a determination that the application has been generated.

17. The method of claim 15, wherein the first virtualized, self-contained computing instance is configured to execute instructions according to a first set of semantics and the second virtualized, self-contained computing instance is configured to execute instructions according to a second set of semantics.

18. The method of claim 15, further comprising:
determining, prior to executing the first virtualized, self-contained computing instance and the second virtualized, self-contained computing instance, the second virtualized, self- contained computing instance has at least one dependency on the first virtualized, self-contained computing instance; and executing the second virtualized, self-contained computing instance prior to executing the first virtualized, self-contained computing instance based on the determination.

19. The method of claim 15, further comprising:

generating the first virtualized, self-contained computing instance by generating a first lightweight container; and generating the second virtualized, self-contained computing instance by generating a second lightweight container, wherein the first lightweight container and the second lightweight container are configured to not maintain a state associated therewith.

20. The method of claim 15, wherein the first VSCI image corresponds to a first portion of an executable application and the second VSCI image corresponds to a second portion of the executable application.

* * * * *